(12) United States Patent
Hirano et al.

(10) Patent No.: US 6,844,650 B2
(45) Date of Patent: Jan. 18, 2005

(54) MULTIPOLAR MAGNETOGENERATOR (75) Inventors: Tsutomu Hirano, Wako (JP); Yasuhiro Shinkawa, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/413,453

(22) Filed: Apr. 14, 2003

(65) Prior Publication Data
US 2004/0000831 A1 Jan. 1, 2004

(30) Foreign Application Priority Data
Apr. 26, 2002 (JP) ........................................ 2002-126472

(51) Int. Cl.⁷ .................................................. H02K 3/00
(52) U.S. Cl. ........................ 310/198; 310/254; 310/259
(58) Field of Search ............................ 310/67 R, 70 A, 310/184, 179–180, 185, 186, 198, 254, 257, 258, 259, 216, 24, 12, 22, 26

(56) References Cited

U.S. PATENT DOCUMENTS

| | | | |
|---|---|---|---|
| 3,678,913 A | | 7/1972 | Zimmermann et al. .. 423/149 P |
| 4,019,485 A | * | 4/1977 | Carlsson ...................... 123/599 |
| 4,892,079 A | * | 1/1990 | Umezu et al. ......... 123/406.57 |
| 5,825,108 A | * | 10/1998 | De Filippis ............... 310/67 R |

FOREIGN PATENT DOCUMENTS

| | | |
|---|---|---|
| EP | 0 722 210 A2 | 7/1996 |
| JP | 06261501 | 9/1994 |
| JP | 7-13415 | 3/1995 |

* cited by examiner

*Primary Examiner*—Tran Nguyen
*Assistant Examiner*—Leda Pham
(74) *Attorney, Agent, or Firm*—Carrier, Blackman & Associates, P.C.; Joseph P. Carrier; William D. Blackman (57) ABSTRACT

A multipolar magnetogenerator, which is operable under sufficient performance of its capability, permitting simultaneous extraction of various voltage outputs and is excellent in spatial efficiency, includes a magnet rotor (3) as an outer rotor and a multipolar stator (10) opposed to the radially inner surface of the magnet rotor (3) to permit extraction of an output of generated power from output windings (30) wound around the stator core 10. A transformer core (21) has a primary winding (31) and secondary windings (32, 33) wound therearound and is located adjacent the radially inner circumferential surface of the stator (10), which is remote from the magnet rotor (3), and the output windings (30) are connected to the primary wiring (32) such that transformed outputs are extracted from the secondary windings (32, 33).

12 Claims, 8 Drawing Sheets

PRIOR ART

MULTIPOLAR MAGNETOGENERATOR

BACKGROUND OF THE INVENTION

1. Field of the Invention

This invention relates to a multipolar magnetogenerator having a magnetic rotor and an opposed multipolar stator to permit extraction of generated power from output windings wrapping the stator core.

2. Description of the Related Art

Multipolar magnetogenerators are compact and light but can nevertheless generate relatively large energy. Recently, therefore, they are widely used as power sources of engine-driven portable generators, such as power-generating portions of inverter-controlled generators.

In case of extracting different independent outputs, like different voltage outputs, from such a multipolar magnetogenerator, it was a typical way to wrap multiple generating portions of the stator with windings adjusted for required outputs independently as disclosed in Japanese Examined Utility Model Publication hei 7-13405.

Figure 9:
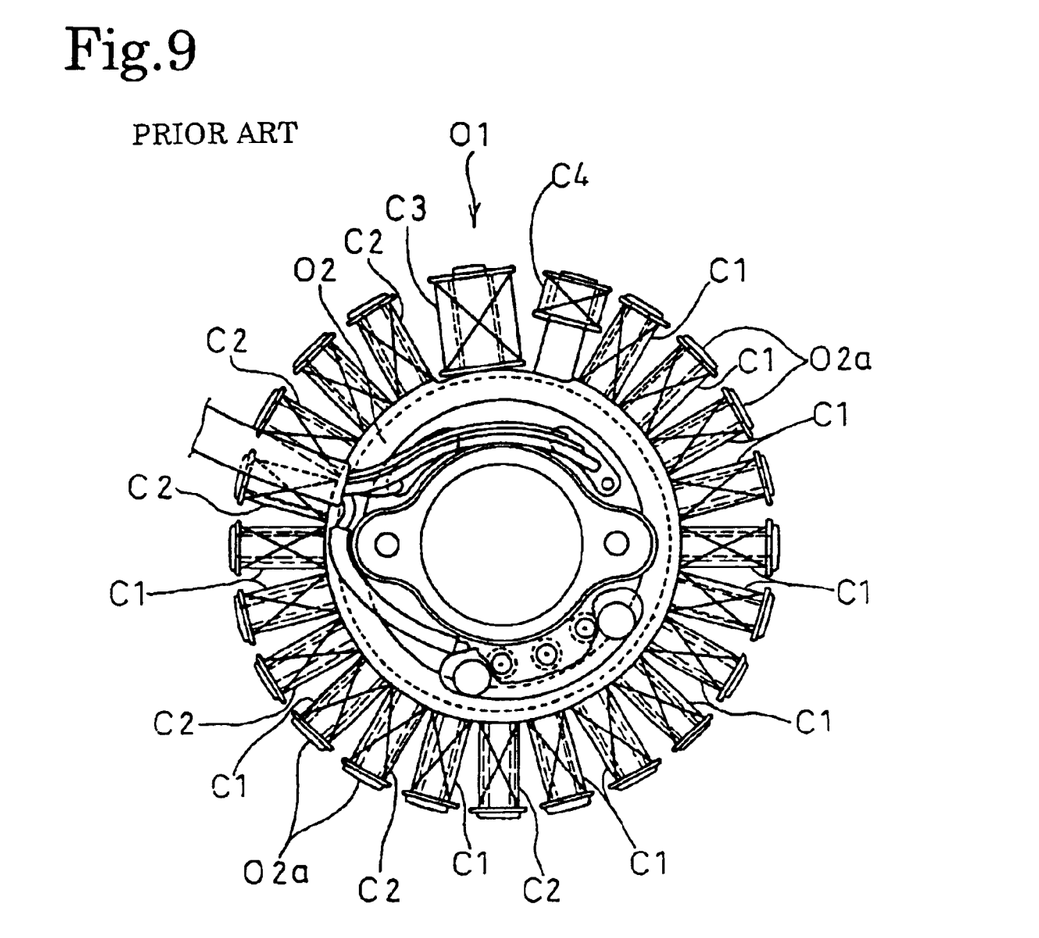
FIG. 9 is a front elevational view of an example of a stator of a known multipolar magnetogenerator.

FIG. 9 shows the stator 01 of an outer rotor type generator that is the multipolar magnetogenerator disclosed by that publication. In FIG. 9, a stator core 02 has 23 salient poles 02a projecting radially outwardly. Among these salient poles 02a, 15 salient poles are wrapped with power-generating armature coils C1, six salient poles with coils C2 for battery-charging electric power, one salient pole with a single-phase ignition power coil C3, and the last one salient pole with a single-phase power source generating coil C4. The power-generating armature coils C1 and the coils C2 for battery-charging electric power are connected in three phase to generate three-phase alternating-current power, respectively. As such, coils C1, C2, C3 and C4 are wound in a role-sharing manner on 23 salient poles to permit extraction of different voltage outputs.

Although the conventional multipolar magnetogenerator is available for high-output drive, since it uses salient poles independently in a role-sharing manner as power generating portions different in output characteristics, its total output of generated power does not reach the output that should be obtained when making the best use of the true capability of power generation.

It is therefore an object of the invention to provide a multipolar magnetogenerator operable under sufficient performance of its capability of power generation, nevertheless permitting simultaneous extraction of various voltage outputs, and excellent in spatial efficiency.

SUMMARY OF THE INVENTION

To accomplish the object, a multipolar magnetogenerator according to the invention having a magnet rotor, and a multipolar stator including a stator core oppposed to the magnet rotor and output windings wound around the stator core to extract, an output of generated power from the output windings characterized by; a transformer having a core located on a circumferential surface opposite from the circumferential surface facing the magnet rotor of the stator; a primary winding wound around the core of the transformer; and connected to the output windings; and secondary windings wound around the core of the transformer to extract outputs of the transformer.

With the multipolar magnetogenerator according to the invention, having the above-summarized configuration, outputs of identical output characteristics can be obtained from output windings on all salient poles of the stator core. Therefore, a high output can be obtained by driving the multipolar magnetogenerator in a high-efficiency range. Additionally, by connecting the output windings to the primary winding on the transformer portion and extracting only necessary quantities of outputs of various voltages from the secondary windings, it is possible not only to extract high output under sufficient performance of the original capability of power generation as a multipolar magnetogenerator but also to simultaneously extract outputs of various voltages.

Additionally, since the transformer core is located adjacent to the circumferential surface of the stator, which is opposite from the circumferential surface thereof opposed to the magnet rotor, it is possible to use one side of the stator substantially in no use as the path of the stator core and to thereby prevent upsizing of the stator. Furthermore, since the transformer portion is integral with the stator, it can be cooled simultaneously with the output windings of the stator.

The transformer core preferably is associated with the stator core to form a closed magnetic circuit. By using the stator core, the closed magnetic circuit of the transformer portion can be made easily, and a portion of the stator core opposite from a portion used as a magnetic path for power generation can be effectively used as a magnetic path for the transformer.

The magnet rotor is preferably an outer rotor located around the stator such that a space is formed radially inward of the stator core and the transformer core is formed to extend in the space radially inwardly from the stator core. The magnet rotor made configured as an outer rotor makes it possible to effectively use the transformer portion in the inner space of the stator core that has been difficult to use in the conventional generator and to reliably prevent upsizing of the multipolar magnetogenerator.

The radially inward end portion of the transformer may be extended in circumferential directions to form arm portions and to use these arm portions to make a transformer's magnetic path passing through the transformer core. Such extension of the arm portions in the circumferential directions form the inner circumferential end of the transformer core makes it easy to form a closed magnetic circuit in cooperation with the stator core.

Support projections for fixing wiring terminals may be formed as radially inward projections of the stator core, and these support projections may be used to form a transformer's magnetic path passing through the transformer core. By forming such support portions for fixture of wiring terminals to project radially inwardly, it is possible not only to support the wiring terminals inside the stator core and for making the effective use of the space but also to use the same support portions to make a closed magnetic circuit together with the transformer core.

A rotary axis of the rotor may extend through the space radially inward of the transformer core such that the portion including the rotary shaft makes a transformer's magnetic path passing through the transformer core. By employing this configuration positioning the rotary shaft of the rotor to extend through the space inside the inner circumferential surface of the transformer, the rotary shaft can be directly, effectively used as the transformer's magnetic path.

The transformer core may have a multi-layered structure of steel plates and a separate element from the stator core such that it can be wrapped with the primary and secondary coils before it is assembled to the stator core. In this case, the transformer core can be made by punching from stacked steel plates with a press die simultaneously with the stator core. Thus the transformer can be manufactured efficiently, and the production yield of expensive electromagnetic steel plates is improved. Further, since the transformer core is manufactured as a separate member from the stator core, the work of wrapping the transformer core with windings is easier.

It is preferable to extend the radially inward end of the transformer core in the circumferential directions to form the arm portions and form support projections as radially inward extensions of the stator core so as to support the transformer core between two adjacent arm portions. With this structure, the transformer core can be reliably assembled inside the stator core.

A plurality of support projections may be formed as radially inward extensions of the stator core to support a wiring terminal holder between two adjacent support projections. With this structure, the wiring terminal holder can be reliably assembled inside the stator core.

DESCRIPTION OF THE PREFERRED EMBODIMENTS

Figure 1:
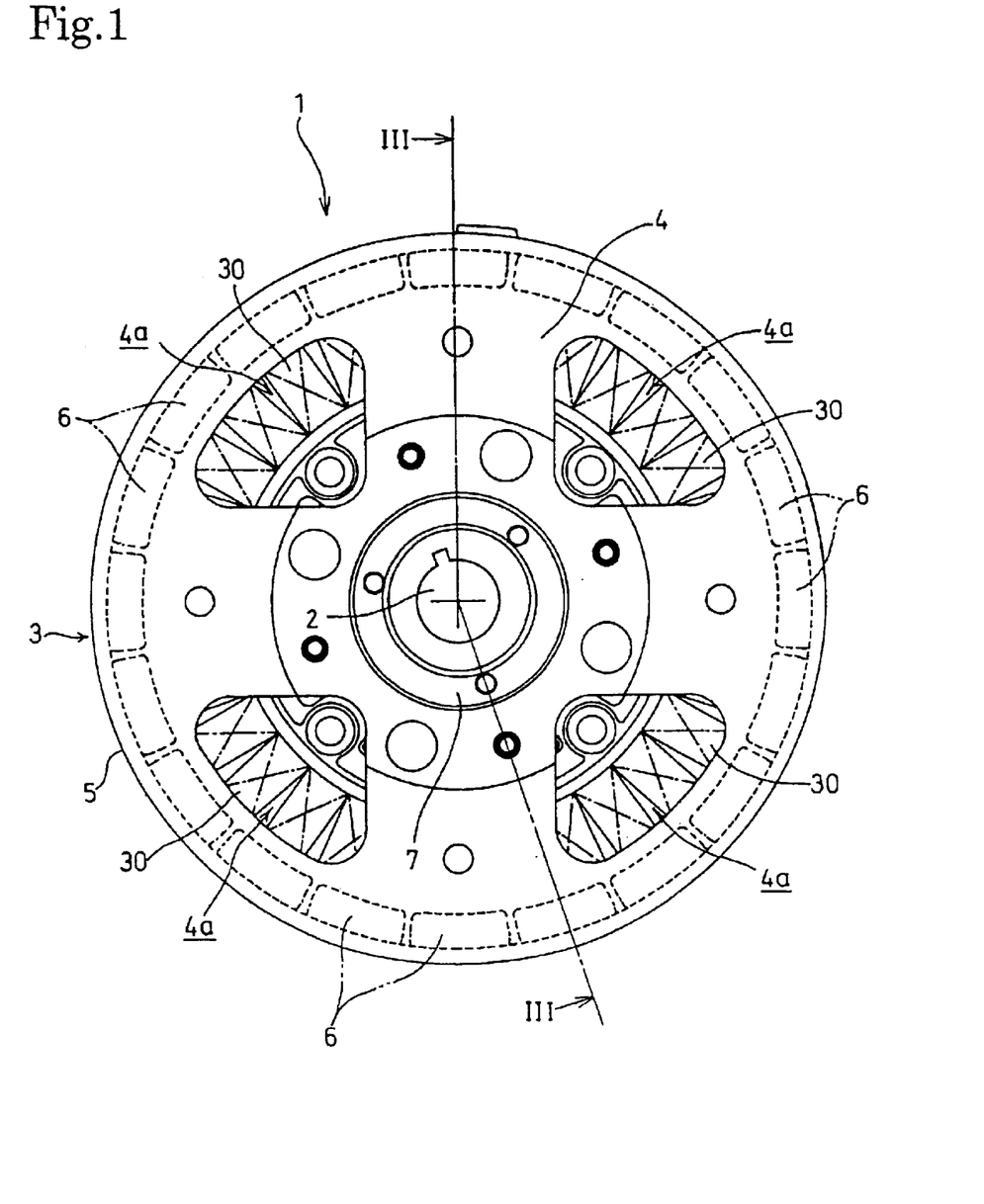
FIG. 1 is a front elevational view of a multipolar magnetogenerator according to an embodiment of the invention.
Figure 2:
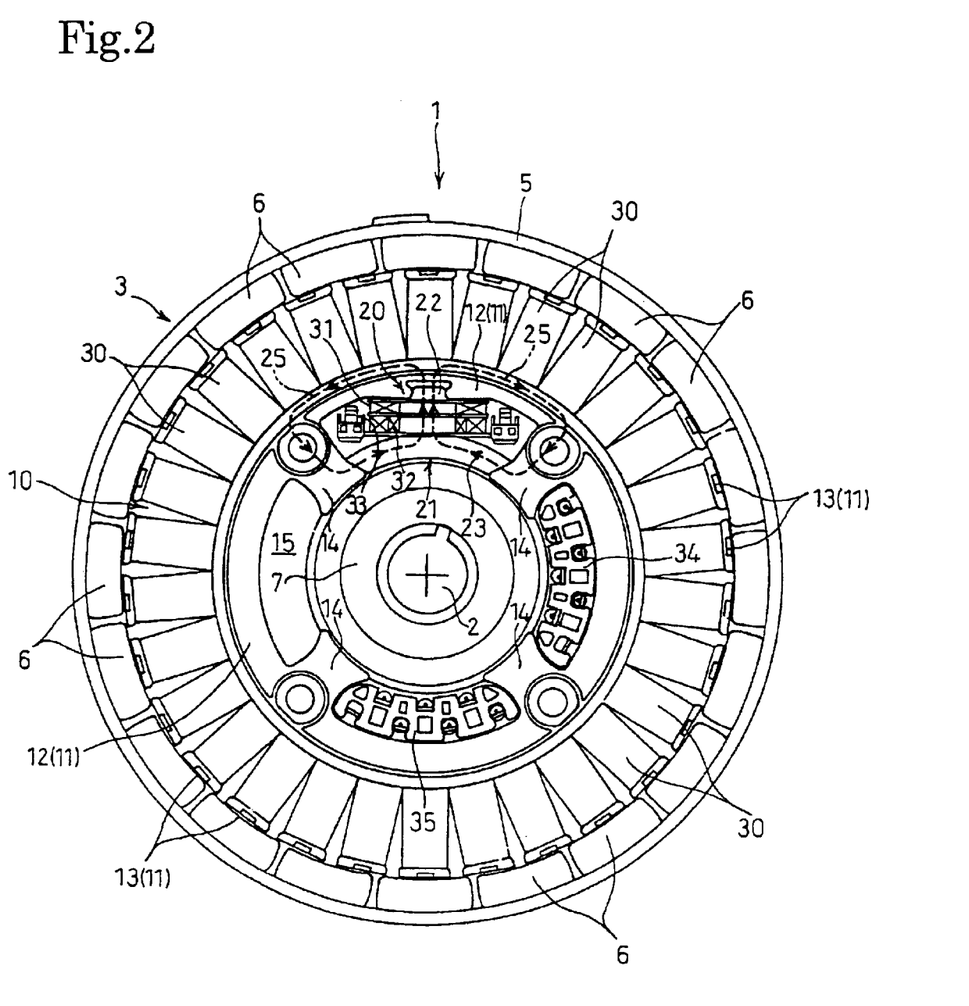
FIG. 2 is a back view of the same multipolar magnetogenerator.
Figure 3:
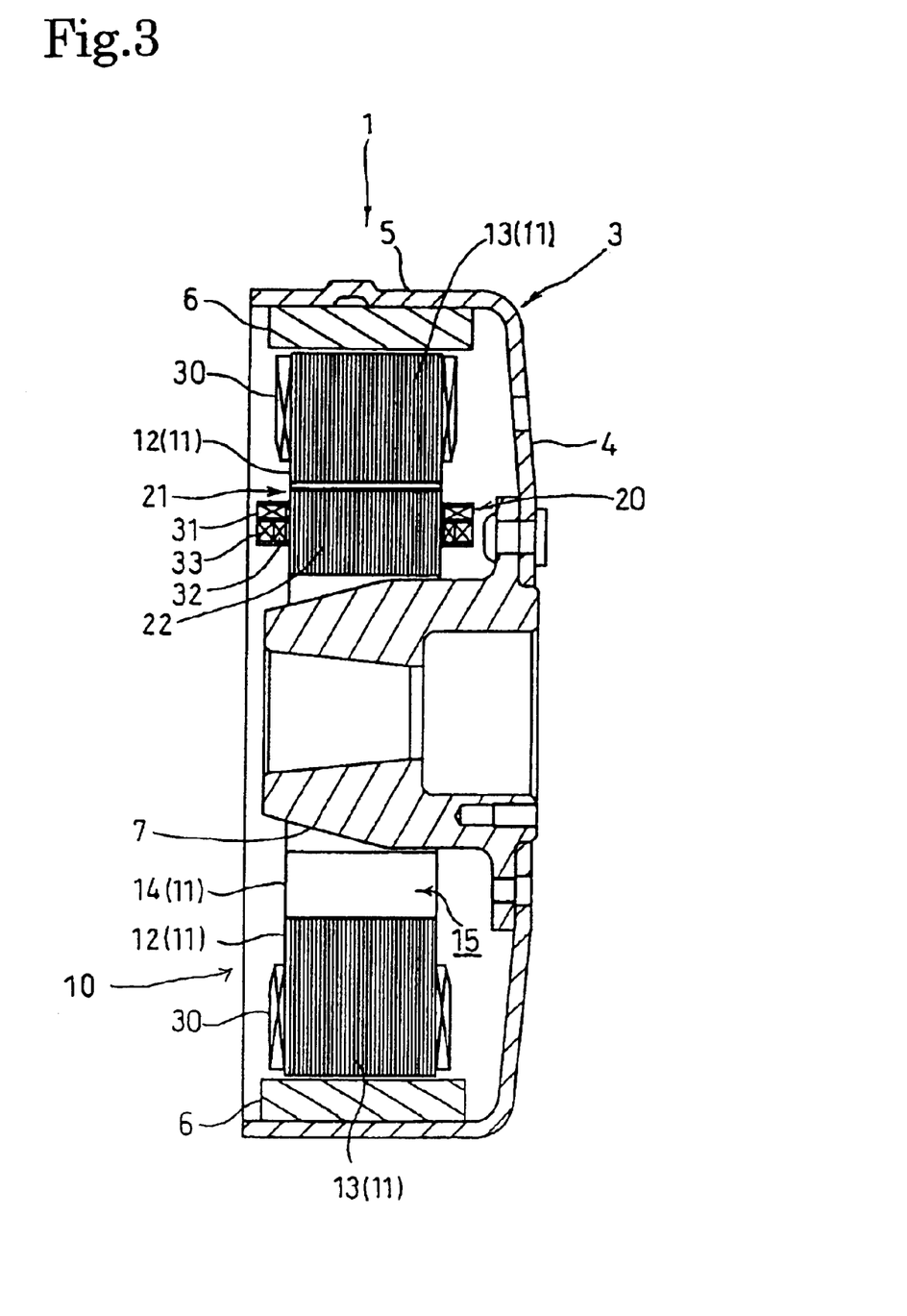
FIG. 3 is a sectional view taken along the III—III line of FIG. 1.

An embodiment of the invention will now be described below with reference to FIGS. 1 through 6. A multipolar magnetogenerator according to the embodiment is shown in its front elevational view in FIG. 1 and in its back view in FIG. 2. In addition, a sectional view taken along the line III—III of FIG. 1 is shown in FIG. 3. The multipolar magnetogenerator according to the invention is of an outer rotor type placing an annular magnet rotor 3 around a stator 10 (FIG. 2).

The magnet rotor 3 constitutes an outer rotor commonly used as a flywheel. As best shown in FIG. 3, the magnet rotor 3 has a disk-shaped bottom wall 4 and a cylindrical outer wall 5 that form a bottomed cylinder or a cup. The magnet rotor 3 is fitted on a rotary shaft 2 extending through the bottom wall 4 via a sleeve 7, and supported by the rotary shaft 2 to rotate together with the rotary shaft 2. The bottom wall 4 of the cylindrical magnet rotor 3 has a circular bore receiving the central sleeve 7 therein, and has formed cooling air openings 4a, which may be four openings, for example, at equal intervals around the circular bore.

On the inner circumferential surface of the cylindrical outer wall 5, magnets 6, which may be 20 magnets, are arranged annularly in the circumferential direction. Each magnet 6 is polarized in N and S poles in radial directions of the generator 1, and radially outer and inner ends of adjacent magnets 6 confront with opposite polarities.

A stator 10 is contained in the inner space facing the annularly aligned magnets 6. As shown in FIG. 2, the stator 10 is disposed around the sleeve 7 and has a stator core 11 fixed at its central part. The stator includes 30 salient poles 13, for example, that radially outwardly project in its outer circumferential region. The salient poles 13 are wrapped with output windings 30. The salient poles 13 are radially opposed to the magnets 6 with a small gap therebetween.

Figure 4:
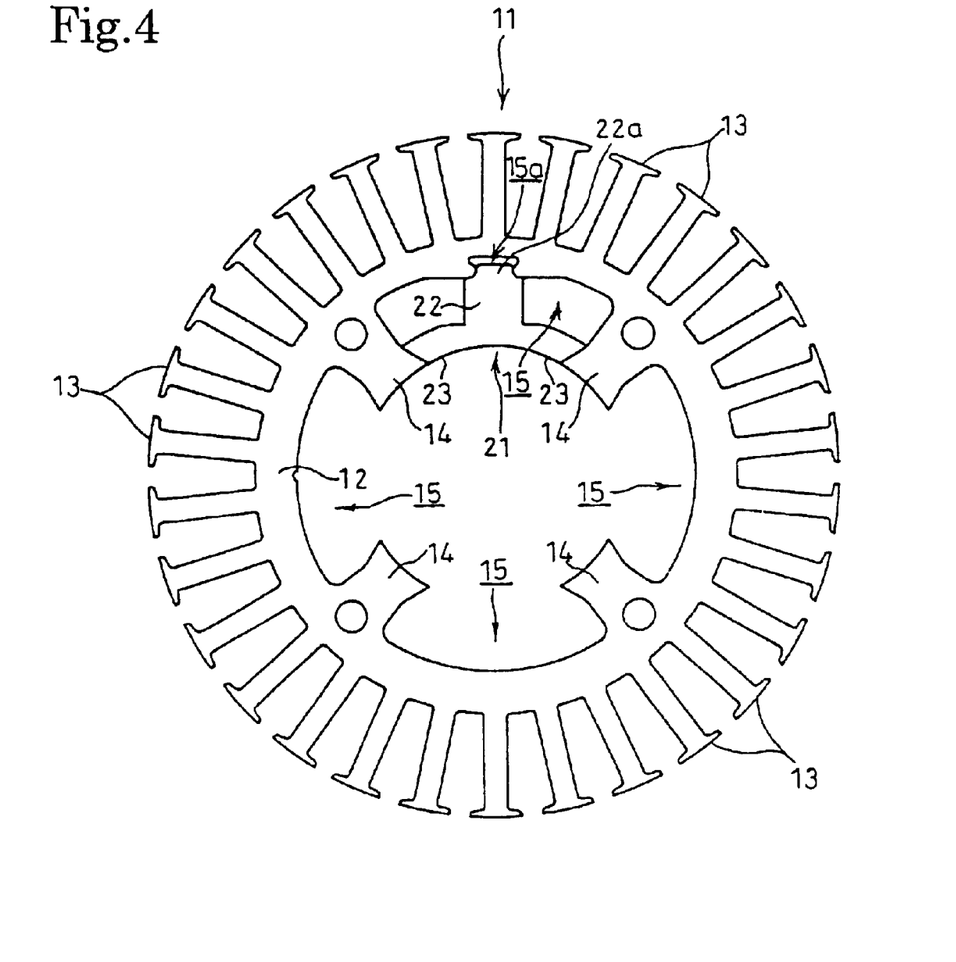
FIG. 4 is a front elevation showing a stator core and a transformer core assembled together.

The stator core 11 is made by punching of electromagnetic steel plates with a press die and stacking the punched members. FIG. 4 shows the stator core 11 obtained by press punching. From the stator core base portion 12, 30 salient poles 13, for example, extend radially outwardly, and four support projections 14, for example, extend at equal intervals radially inwardly toward the center.

Between adjacent support projections 14, 14, a sectorial space 15 is formed, and a transformer 20 and wiring terminal holders 34 and 35 are disposed therein. The transformer 20 has a transformer core 21, and it can be punched out simultaneously when each core plate that forms the stator core 11 is punched out from an electromagnetic steel plate as shown in FIG. 4. The transformer core 21 is formed such that its winding-wrapped core portion 22 to be wrapped with windings extends in the radially outward direction while passing the center of one of the sectorial spaces 15, and the inner circumferential end portion of the winding-wrapped core portion 22 is extended in opposite directions along the circumferential direction to form arm portions 23. The arm portions 23 are configured to contact under pressure with distal ends of the support projections 14 of the stator core 11, respectively. The stator core base portion 12 has a groove 15a having a trapezoidal cross section at an outer circumferential section aligned with the sectorial space 15 in which the transformer core 21 is formed, and the transformer core 21 has a projection 22a at the distal end of the winding-wrapped core portion 22 for engagement with the groove 15a.

Figure 5:
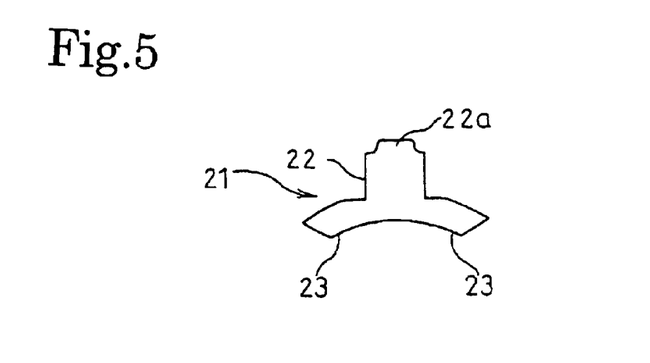
FIG. 5 is a front elevational view of the transformer core.

Thus, the transformer core 21 having the shape shown in FIG. 5 is formed as a separate body from the stator core 11. However, as shown in FIG. 4, the transformer core 21 is held in position by pressure contact of its arm portions 23, 23 press-fitted and sandwiched by support projections 14, 14 of the stator core 11 from opposite sides and by press fitting of the projection 22a at the distal end of the winding-wrapped core 22 in the groove 15a. The transformer core 21 can be made by punching out stacked steel plates with a press die simultaneously with the stator core 11, and therefore, it can be manufactured efficiently while improving the production yield of expensive electromagnetic steel plates.

As shown in FIG. 2, one primary winding 31 and two secondary windings 32 and 33 are wound around the core portion 22 of the transformer core 21. The primary winding 31 is wound around the radially outer portion of the core portion 22 while one of the secondary windings 32 is wound around the radially inner portion of the core portion 22 and the other secondary winding 33 is wound around the former secondary winding 32. As such, since the transformer core 21 is formed separately from the stator core 11, the work of winding the primary winding 31 and the secondary windings 32 and 33 is easier, and the transformer 20 completed with necessary windings can be inserted in the predetermined sectorial space 15. This totally makes the manufacturing process of the generator easier.

Further, since the generator is of the outer rotor type, the transformer portion can be placed in the inner space of the stator core, which was difficult to utilize in the conventional multipolar magnetogenerator, and the efficient use of the space prevents upsizing of the transformer-contained multipolar magnetogenerator. Once the transformer 20 is assembled to the stator 10, the winding-wrapped core portion 22 and the arm portions 23 of the transformer core 22 and the support projections 14 of the stator core base portion 12 makes a magnetic path and form a closed magnetic circuit 25 (FIG. 2).

Therefore, the closed magnetic circuit 25 of the transformer 20 can be readily formed by using the stator core 11, and simultaneously, the portion of the stator core 11 in the opposite side (nearer to the support projection 14) from the portion used as the magnetic path for generating electric power (nearer to the salient pole 13) can be used as the magnetic path for the transformer.

Figure 7:
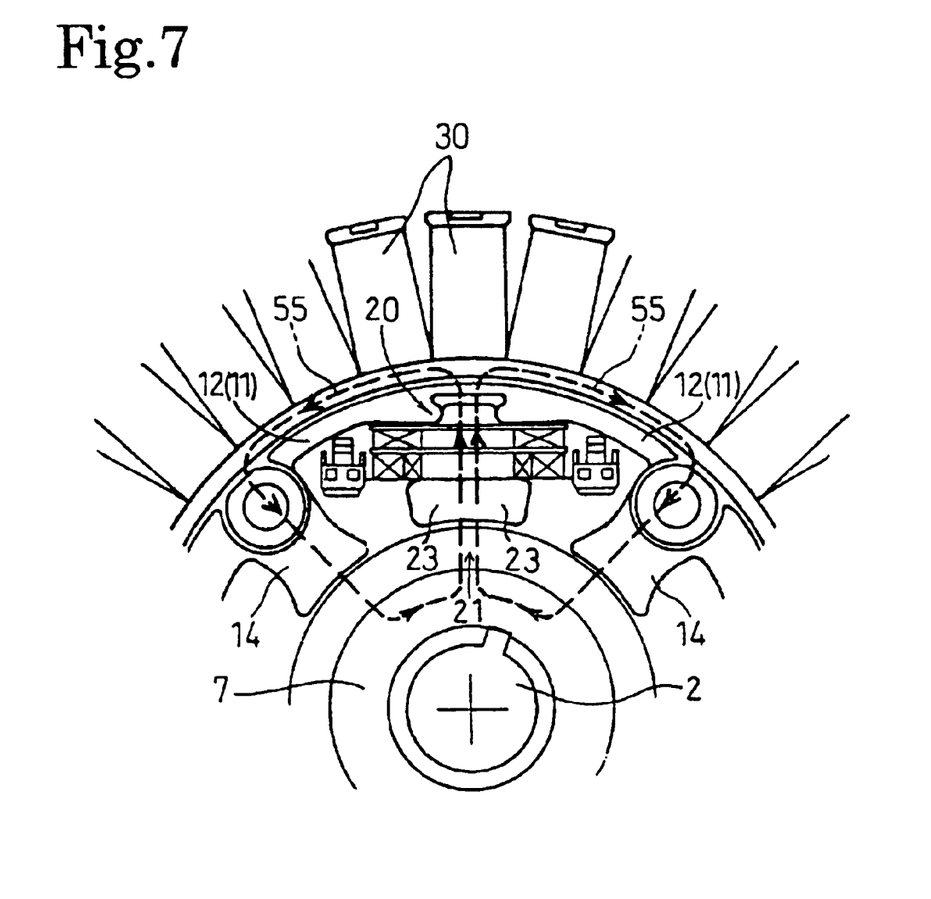
FIG. 7 is an enlarged view of an essential part of a transformer-contained multipolar magnetogenerator modified from the foregoing embodiment.

In the transformer 20, the arm portions 23 may be shorter to be more distant from the support projections 14 as shown in FIG. 7. In case the arm portions 23 are shorter, the rotary shaft portion (rotary shaft 2 and sleeve 7) of the magnet rotor 3 extending along the inner side of the inner wall surface of the transformer core 21 can be used as the magnetic path to form the closed magnetic circuit 55.

Since the transformer 20 is made integrally with the stator 10, the output windings 30 of the stator 10 and the transformer 20 can be cooled simultaneously and easily.

In two other sectorial spaces 15 of the stator core 11, the wiring terminal holders 34, 35 are received as shown in FIG. 2, and the support projections 14 of the stator core 11 at opposite sides of the wiring terminal holder 34 and those at opposite sides of the wiring terminal holder 35 sandwich and hold them respectively. Therefore, the wiring terminal holders 34 and 35 can be placed and held efficiently in space.

When the multipolar magnetogenerator 1 having the above-described construction is driven, an engine-driven generator is formed. An engine-driven generator of this type will be described with reference to FIG. 6.

Figure 6:
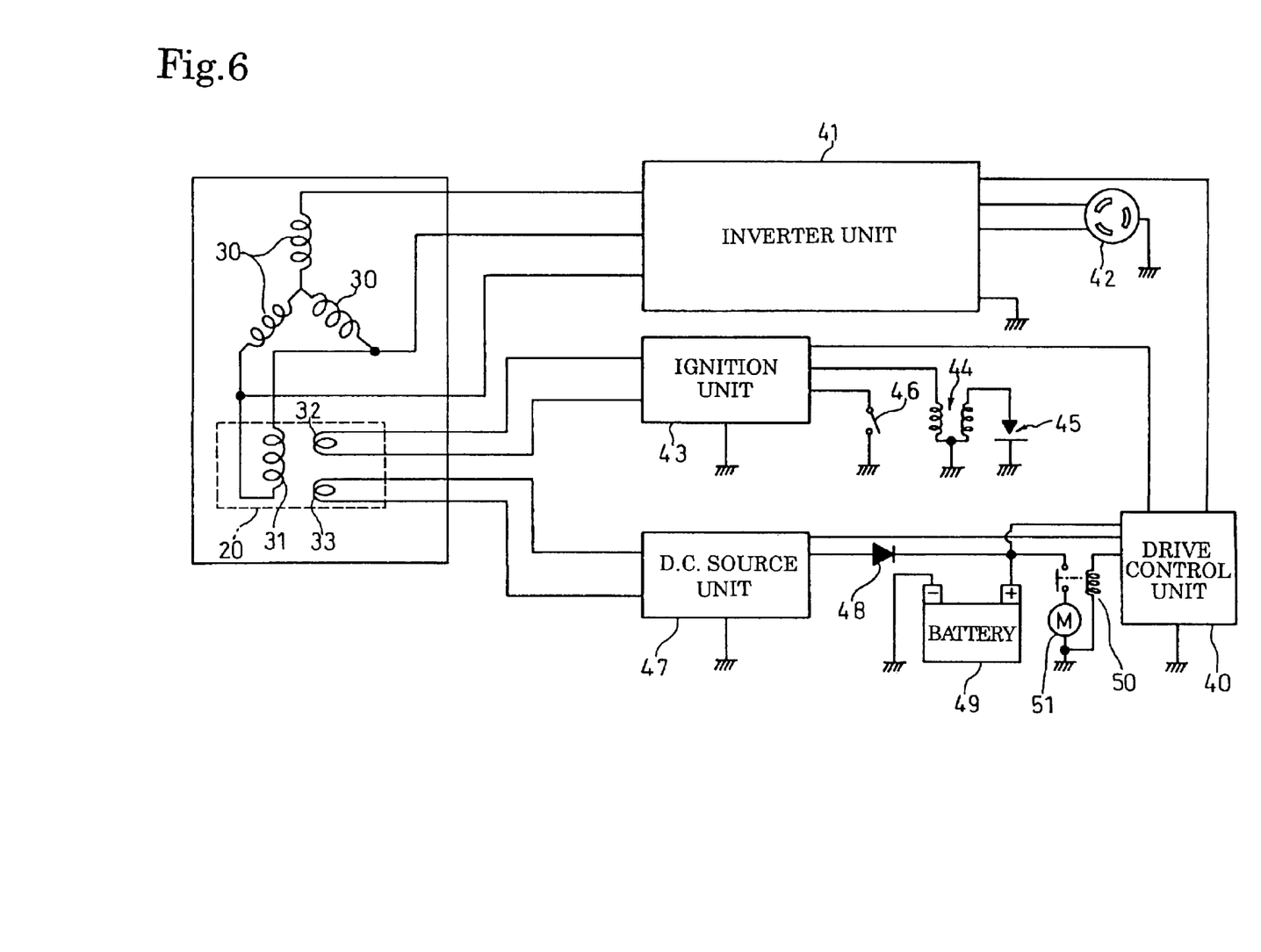
FIG. 6 is a diagram showing an exemplary circuit for outputting generated power in the same multipolar magnetogenerator.

The rotary shaft 2 of the multipolar magnetogenerator 1 is connected to the crankshaft of an engine, not shown. When the engine is driven, a three-phase alternating-current power is output from the three-phase output windings 30 wound around the multipolar stator core 11. Output terminals of the three-phase output windings 30 wound around the multiplolar stator core 11 are connected to an input end of an inverter unit 41. The three-phase alternating-current power introduced into the inverter unit 41 is rectified and smoothed, thereafter converted to alternating-current power of the commercial frequency (50 Hz or 60 Hz), and output as a 100V alternating-current voltage from the outlet 42.

Two-phase part of the output of the three-phase output windings 30 is connected to the primary winding 31 of the transformer 20. The secondary wirings 32 and 33 of the transformer are connected as an igniter power source of the engine to an ignition unit 43 and as a power source for controlling the drive of the entire system to a direct-current power source unit 47.

In response to a control signal from a drive control unit 40, explained later, the ignition unit 43 drives an ignition coil 44 with a direct-current voltage of 52V to fire up an ignition plug 45 or activate an engine stop switch 46.

The direct-current power source unit 47 is connected to the drive control unit 40, battery 49 and engine-starting electric motor 51 via a backflow-preventing diode 48 to operate as their 14V direct-current supply source.

The drive control unit 40 supervises the drive of the entire system to start the engine by driving the starting electric motor 51 via a starting electromagnetic switch 50, controls the ignition unit 43 and the engine stop switch 46 as stated before, or controls the function of the inverter unit 41.

Revolution of the engine is controlled in accordance with the load connected to the outlet 42, i.e. the demanded quantity of power, and the output voltage of the three-phase output windings 30 varies as well with the change of the revolution. For example, if the revolution of the engine varies in the range of 2,300 to 4,000 rpm, output voltage of the three-phase output windings 30 changes in the range of 119 to 248V (line-to-line voltage; effective value), output voltage of the transformer's secondary winding 32 of the transformer 20 changes in the range of 19.8 to 41.4V, and output voltage of the secondary winding 33 of the transformer 20 changes in the range of 8.5 to 17.7V.

However, since only an actually required quantity of the output power from the three-phase output windings is supplied to the ignition unit 43 and the direct-current power source unit 47 from the secondary windings 32 and 33 of the transformer 20, the remainder power can be extracted from the outlet 42 without failing to use it. Therefore, the multipolar magnetogenerator 1 may be adjusted to be driven with high efficiency, taking account of the output characteristics of the three-phase windings 30, and it is possible to drive it under a condition making the best use of its capability of generating electric power and to extract respective voltage outputs efficiently.

Figure 8:
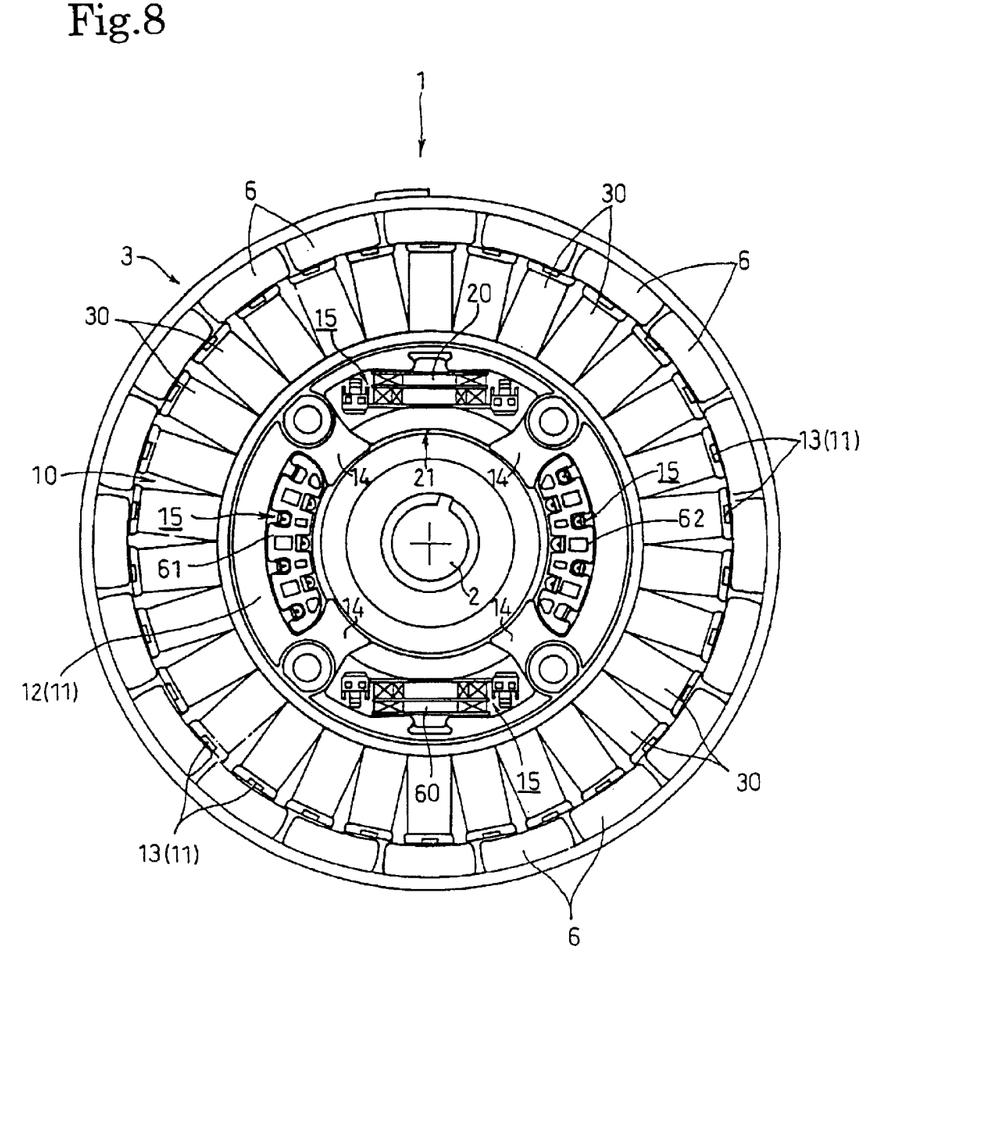
FIG. 8 is a back view of a multipolar magnetogenerator according to another embodiment.

The multipolar generator 1 described above is configured to insert a single transformer 20 inside the stator 10. However, one or more transformers can be added. FIG. 8 shows a modification of the foregoing embodiment by adding a transformer 60.

In two of the four sectorial spaces 15 of the stator core 11 opposed in the diametric direction, the above-described transformer 20 and the additional transformer 60 are received, respectively. In the other two opposed sectorial spaces 15, wiring terminal holders 61 and 62 are received. The transformer 60 is identical in shape to the transformer 20, and received in the sectorial spaces 15 identical in shape.

By using the additional transformer in this manner, more various voltage outputs can be obtained easily. Simultaneously, since the transformers 20 and 60 can be placed by making use of the inner space of the stator 10, the multipolar magnetogenerator need not be upsized.

Although there have been described what are the present embodiments of the invention, it will be understood that variations and modifications may be made thereto without departing from the spirit or essence of the invention.

What is claimed is:

1. A multipolar magnetogenerator including a magnet rotor having a circumferential surface, and a multipolar stator with a stator core having a first circumferential surface opposed to said circumferential surface of the magnet rotor, said multipolar stator having output windings wound around the stator core to extract an output of generated power from the output windings, comprising:

a transformer having a core located adjacent to a second circumferential surface of the stator, wherein said second circumferential surface of the stator, is situated remote from said circumferential surface of the magnet rotor;

a primary winding wound around the core of the transformer and connected to the output windings;

secondary windings wound around the core of the transformer to extract outputs of the transformer; and said transformer core being associated with said stator core to make a closed magnetic circuit.

2. A multipolar magnetogenerator according to claim 1 wherein the magnet rotor constitutes an outer rotor located around the stator, and a space is formed radially inwardly within the stator core, and the transformer core is disposed in the space formed radially inwardly from the stator core.

3. A multipolar magnetogenerator according to claim 2 wherein the radially inner end portion of the transformer core is extended in a circumferential direction to form arm portions that make a transformer's magnetic path passing through the transformer core.

4. A multipolar magnetogenerator according to claim 2 wherein support projections for fixing wiring terminals are formed as radially inward extensions of the stator core, and the support projections make a transformer's magnetic path passing through the transformer core.

5. A multipolar magnetogenerator according to claim 2 wherein the rotor has a rotary shaft extending through the transformer core along the radially inner circumferential surface thereof, and a portion including the rotary shaft forms a transformer's magnetic path passing through the transformer core.

6. A multipolar magnetogenerator according to claim 1 wherein the transformer core has a multi-layered structure of steel plates prepared as a separate element from the stator core, and has the primary winding and the secondary windings wound on the transformer core before the transformer core is assembled to the stator core.

7. A multipolar magnetogenerator according to claim 2 wherein the radially inner end portion of the transformer core is extended circumferentially to form the arm portions, a plurality of support projections are formed as radially inward extensions of the stator core, and the arm portions are suported between two adjacent ones of said support projections.

8. A multipolar magnetogenerator according to claim 2 wherein a plurality of support projections are formed as radially inward extensions of the stator core and a wiring terminal holder is supported between two adjacent ones of said projections.

9. A multipolar magnetogenerator according to claim 1 wherein said second circumferential surface of said stator core is an inner circumferential surface thereof.

10. A multipolar magnetgenerator according to claim 1 wherein said transformer core is supported on said stator core by pressure contact therebetween.

11. A multipolar magnetogenerator according to claim 7 wherein a plurality of support projections are formed as radially inward extensions of the stator core and a wiring terminal holder is supported between two adjacent ones of said support projections.

12. A multipolar magnetogenerator according to claim 1 wherein a radially inner end portion of the transformer core is extended circumferentially to form arm portions, said arm portions define a magnetic path passing through the transformer core.

* * * * *

UNITED STATES PATENT AND TRADEMARK OFFICE
CERTIFICATE OF CORRECTION

PATENT NO.    : 6,844,650 B2
DATED         : January 18, 2005
INVENTOR(S)   : Hirano et al.

It is certified that error appears in the above-identified patent and that said Letters Patent is hereby corrected as shown below:

Title page,
Item [56], References Cited, US PATENT DOCUMENTS, "3,678,913," reference, change the classification number from "423/149" to -- 123/149 --;
Item [57], ABSTRACT,
Delete all numbers in the abstract, such that the ABSTRACT reads as follows:
-- A multipolar magnetogenerator, which is operable under sufficient performance of its capability, permitting simultaneous extraction of various voltage outputs and is excellent in spatial efficiency, includes a magnet rotor as an outer rotor and a multipolar stator opposed to the radially inner surface of the magnet rotor to permit extraction of an output of generated power from output windings wound around the stator core. A transformer core has a primary winding and secondary windings wound therearound and is located adjacent the radially inner circumferential surface of the stator, which is remote from the magnet rotor, and the output windings are connected to the primary wiring such that transformed outputs are extracted from the secondary windings. --

Column 1,
Line 58, change the semicolon after "characterized by" to a colon;
Line 62, delete the semicolon after "former".

Column 2,
Lines 42 and 43, change "tions form the inner" to -- tions from the inner --

Column 5,
Lines 12 and 13, change "12 makes a magnetic" to -- 12 make a magnetic --

UNITED STATES PATENT AND TRADEMARK OFFICE
CERTIFICATE OF CORRECTION

PATENT NO. : 6,844,650 B2
DATED : January 18, 2005
INVENTOR(S) : Hirano et al.

It is certified that error appears in the above-identified patent and that said Letters Patent is hereby corrected as shown below:

<u>Column 8,</u>
Line 5, change "said projections." to -- said support projections. --.

Signed and Sealed this

Seventeenth Day of May, 2005

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,844,650 B2 |
| APPLICATION NO. | : 10/413453 |
| DATED | : January 18, 2005 |
| INVENTOR(S) | : Hirano et al. |

It is certified that error appears in the above-identified patent and that said Letters Patent is hereby corrected as shown below:

Title page,
Item [56], References Cited, US PATENT DOCUMENTS, "3,678,913," reference, change the classification number from "423/149" to -- 123/149 --;
Item [57], ABSTRACT,
Delete all numbers in the abstract, such that the ABSTRACT reads as follows:
-- A multipolar magnetogenerator, which is operable under sufficient performance of its capability, permitting simultaneous extraction of various voltage outputs and is excellent in spatial efficiency, includes a magnet rotor as an outer rotor and a multipolar stator opposed to the radially inner surface of the magnet rotor to permit extraction of an output of generated power from output windings wound around the stator core. A transformer core has a primary winding and secondary windings wound therearound and is located adjacent the radially inner circumferential surface of the stator, which is remote from the magnet rotor, and the output windings are connected to the primary wiring such that transformed outputs are extracted from the secondary windings. --

Column 1,
Line 58, change the semicolon after "characterized by" to a colon;
Line 62, delete the semicolon after "former".

Column 2,
Lines 42 and 43, change "tions form the inner" to -- tions from the inner --

Column 5,
Lines 12 and 13, change "12 makes a magnetic" to -- 12 make a magnetic --

UNITED STATES PATENT AND TRADEMARK OFFICE
CERTIFICATE OF CORRECTION

| | |
|---|---|
| PATENT NO. | : 6,844,650 B2 |
| APPLICATION NO. | : 10/413453 |
| DATED | : January 18, 2005 |
| INVENTOR(S) | : Hirano et al. |

It is certified that error appears in the above-identified patent and that said Letters Patent is hereby corrected as shown below:

<u>Column 8,</u>
Line 29, change "said projections." to -- said support projections. --.

This certificate supersedes Certificate of Correction issued May 17, 2005.

Signed and Sealed this

Seventeenth Day of October, 2006

JON W. DUDAS
*Director of the United States Patent and Trademark Office*

UNITED STATES PATENT AND TRADEMARK OFFICE
CERTIFICATE OF CORRECTION

PATENT NO. : 6,844,650 B2
APPLICATION NO. : 10/413453
DATED : January 18, 2005
INVENTOR(S) : Hirano et al.

It is certified that error appears in the above-identified patent and that said Letters Patent is hereby corrected as shown below:

Title page,
Item [56], References Cited, US PATENT DOCUMENTS, "3,678,913," reference, change the classification number from "423/149" to -- 123/149 --;
Item [57], ABSTRACT,
Delete all numbers in the abstract, such that the ABSTRACT reads as follows:
-- A multipolar magnetogenerator, which is operable under sufficient performance of its capability, permitting simultaneous extraction of various voltage outputs and is excellent in spatial efficiency, includes a magnet rotor as an outer rotor and a multipolar stator opposed to the radially inner surface of the magnet rotor to permit extraction of an output of generated power from output windings wound around the stator core. A transformer core has a primary winding and secondary windings wound therearound and is located adjacent the radially inner circumferential surface of the stator, which is remote from the magnet rotor, and the output windings are connected to the primary wiring such that transformed outputs are extracted from the secondary windings. --

Column 1,
Line 58, change the semicolon after "characterized by" to a colon;
Line 62, delete the semicolon after "former".

Column 2,
Lines 42 and 43, change "tions form the inner" to -- tions from the inner --

Column 5,
Lines 12 and 13, change "12 makes a magnetic" to -- 12 make a magnetic --

UNITED STATES PATENT AND TRADEMARK OFFICE
CERTIFICATE OF CORRECTION

PATENT NO. : 6,844,650 B2
APPLICATION NO. : 10/413453
DATED : January 18, 2005
INVENTOR(S) : Hirano et al.

It is certified that error appears in the above-identified patent and that said Letters Patent is hereby corrected as shown below:

<u>Column 8,</u>
Line 12, change "said projections." to -- said support projections. --.

This certificate supersedes Certificates of Correction issued May 17, 2005 and October 17, 2006.

Signed and Sealed this

Tenth Day of July, 2007

JON W. DUDAS
*Director of the United States Patent and Trademark Office*